Figure 1:
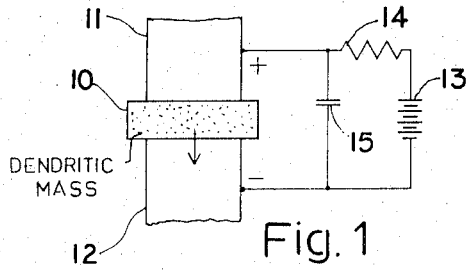

KIYOSHI INOUE
INVENTOR.

BY
Karl G. Ross
AGENT

United States Patent Office 3,356,601
Patented Dec. 5, 1967

3,356,601
CONTROLLED ELECTRICAL DIFFUSION IN AN ELECTROMAGNETIC FIELD
Kiyoshi Inoue, 182 3-Chome, Tamawagayoga-machi, Setagaya-ku, Tokyo-to, Japan
Filed Mar. 4, 1963, Ser. No. 262,466
Claims priority, application Japan, May 21, 1962, 37/19,877
8 Claims. (Cl. 204—156)

The present invention relates to a method of interdiffusing atoms and/or molecules of different materials as well as to molecular reorientation effected by at least limited diffusion.

It is well known that the interdiffusion of atoms or molecules of diverse materials often results in an alteration of their properties and, when at least one of the materials is formed as a solid object, in an improvement in the mechanical characteristics of a body constituted thereby. Of the common atomic diffusion systems, perhaps the most widely applied is the fusion welding of two objects. In the course of the welding process, two metals are juxtaposed and an initial bond established by thermal fusion. Further passage of electrical energy through the junction, exposure of the latter to the heat of a torch, furnace or an induction heating device, or the use of any other heating method results in an increase in the kinetic energy of the atoms or molecules of at least one of the bodies to a point sufficient to enable these activated particles to penetrate more or less deeply into the other body. Consequently, there is formed in the region of the junction a zone of interdiffused atoms and molecules whose properties are readily distinguishable from those of the original bodies. Since the penetration of a body by atoms or molecules of another material is essential random, when achieved by the above-described method, precise control of the extent, nature and uniformity of the diffusion is not normally possible. Moreover, the relatively high thermal energies required to impart sufficient momentum to the randomly moving particles often is sufficient to cause a deterioration of the body. Such deterioration can involve a softening or tempering of the body, an oxidation thereof and even the loss of a desirable constituent by diffusion out of the body of vaporization.

It is also known to diffuse gaseous atoms (e.g., of nitrogen) into metallic bodies with the aid of high thermal energies to change the properties of these metals. In the conventional nitrification of steel, for example, nitrogen atoms are activated and, as a consequence of their high thermal kinetic energy, penetrate into the steel, which is deficient in nitrogen, in a process carried out in a heat-treating or case-hardening furnace. This method is also characterized by the enormous consumption of energy and possibility of deterioration of the body so treated as well as by prolonged treatment times. Similar techniques have also been employed to produce crystal lattices with a defect structure and semiconductors. In both cases a foreign atom of a "doping" element is caused to diffuse into a lattice structure of the base metal with the aid of high thermal energies. Most frequently it has been found to be impossible to control precisely the extent of this diffusion and to localize it, considerable wastage often resulting.

It is a principal object of the present invention, therefore, to provide an improved method of controlledly diffusing submicroscopic particles (e.g., atoms and molecules) with respect to a molecular or lattice structure in such manner as to obviate the aforementioned disadvantages.

A more specific object of the invention is to provide a method of interdiffusing two substances without the expenditure of large amounts of energy at a relatively moderate temperature.

A concomitant object of the invention is to provide a unique welding technique capable of joining together bodies with substantially total control of the characteristics of the welding zone.

Still another object of the invention is to provide an improved method of modifying a lattice structure with molecular reorientation, atomic substitution, and/or alteration of the lattice characteristics.

These objects are attained, in accordance with the invention, by a method of controlledly diffusing submicroscopic particles with respect to a lattice structure which comprises the steps of energizing the particles to an activated state at which they have at least some degree of ionic character and are responsive to electromagnetic force fields. The term "lattice structure" is, in this instance, intended to include broadly all multiatomic structures in which a predetermined orientation is evident. A unidirectional force field is then applied across the lattice structure to accelerate the activated particles which can thus be diffused into the structure from the exterior thereof, diffused out of this structure with or without replacement by a substituent, or relocated within the lattice structure. It has been discovered that such activation of the particles, which generally are atoms of relatively small molecules (preferably, binary and ternary compounds) suffices to impart a charged character to them so that they are capable of passing through, into or out of the lattice structure with a mobility approaching their ionic mobility in solution. This surprising result permits the formation of interdiffused lattice structures in the solid state rather than by growth from a melt.

According to another feature of the invention the substantially charged particles can be formed by activation with the aid of a spark discharge passed between the bodies of material to be interdiffused with the spark serving to ionize the particles and, in some measure, to release them from any molecular bonds originally limiting their mobility. The charge carried by the particles can reside in one or more ionized atoms when the particle is itself molecular in nature. The impulsive character of the spark is, apparently, the predominant factor in mechanically freeing the particles from constraint. In addition, the spark can serve to disrupt the receiving body, at least to a limited extent, thereby further facilitating penetration of the particles into the latter. It is desirable to carry out this spark discharge with an arc frequency approaching the resonant frequency of the particle or in harmony therewith so that a net increase in the vibrational energy mode of the as yet bound particles results. This technique effects rapid rupture of the bond and releases the particle for penetration into the lattices structure. It should be noted, however, that other forms of activation energy can be found siutable, mention made here of thermal, photoelectric and electromagnetic energy other than that applied through the spark discharge for charging the particles although all of these techniques lack the impulsive character of spark discharge.

According to another aspect of this invention a lattice structure can be changed by the use of a high-frequency activation energy whose frequency is approximately equal to the frequency of vibration of an atom forming part of the lattice structure or approximately equal to the algebraic sum of one or more of the frequencies constituting the vibrational mode in accordance with the partition principle. The free atom can then be diffused from the lattice structure with the aid of an electromagnetic force field to produce a defect state which is receptive to the diffusion of other items into the structure. Thus it is possible to replace, in a tetrahedral germanium lattice germanium ions with carbon to yield tetrahedral carbon or diamond.

In general the smaller activated particle will penetrate into a lattice of larger particles with ease while penetration of a larger-size particle into a lattice composed of smaller particles hardly ever occurs without substantial disruption of the smaller lattice. Thus, for example, a particle having an ionic radius of, say, 0.4 A. will radially be diffused into a lattice structure wherein the interatomic spacing is about 2.6 A. It is also desirable to exploit the relative electronegativities of the material to be diffused and the base material. If the base material is more electropositive than the diffusing substance, it should have a more positive electrical charge and vice versa.

The technique described can also be used to controlledly produce semiconductors, scintillation and electro-optical crystals, and other "impurity" lattice structures, by diffusing into a base material an element characterized by a deficiency or surplus of electrons with respect to the base material or another so-called "doping" element. It is, therefore, possible to interdiffuse arsenic and germanium ions to provide the desired degree of electron deficiency (holes) or to diffuse either of these into a selenium base. In this connection it is noted that an activated or ionized arsenic particle (i.e., one which is completely stripped of its valence electrons) has an ionic radius of approximately 0.47 A. units while germanium, which precedes it in the Periodic Table, has an ionic radius of 0.53 A. while selenium, which follows arsenic, has an ionic radius of 0.42 A. It is thus preferred to diffuse arsenic into germanium rather than into selenium since the ionic mobility of the arsenic particle will be greater in a base of germanium wherein the interstitial distances are greater. Similarly, it is preferred to diffuse selenium into arsenic or germanium. In general it may be said, therefore, that it is preferred to diffuse, within any given row of the Periodic Table, a particle having a higher atomic number (lower ionic radius) into a body composed of a material having a lower atomic number (higher ionic radius). As previously noted, carbon can be diffused into a germanium tetrahedral lattice which is more readily grown than the corresponding diamond lattice and, in fact, can be produced at relatively low temperatures and in the absence of superatmospheric pressures by zone refining and controlled vapor deposition. Germanium atoms, which are mobile in their ionized state, can be simultaneously diffused out of the lattice to leave carbon ions at the sites formerly occupied by germanium. This operation is greatly facilitated when carried out with the aid of particles having extremely small ionic radii. Thus carbon which, when completely stripped of its valence electrons by spark discharge or similar forms of activation, has an ionic radius of 0.15 A., can pass substantially freely between the germanium ions of the crystal lattice whose ionic radii are approximately 0.53 A. Again the generalization can be made that in any column of the Periodic Table a diffusion of the material having a lower atomic number into a material having a higher atomic number can be carried out more readily. It is believed that, since atoms having fewer valence electrons are more readily ionized, they are more mobile on the average than those which are more difficultly ionizable. It should be noted that, with a proper selection of the unidirectional field, it is possible to diffuse tungsten into a carbon body to produce with ease a tungsten carbide having a greater hardness than that usually produced under high-temperature fusion of tungsten and carbon.

While activation of particles can take place with the aid of an energizing field whose frequency is a harmonic or integral multiple of the vibrational mode of the particles, a directed diffusion of particles in accordance with the present invention can only be carried out upon their ionization. The energizing field is, consequently, so selected that it can serve to strip one or more electrons from at least one atom of each particle or to cause the release of an ion from a crystal lattice. I have discovered that it is possible to produce a mobile ion of this type with the aid of an activation field whose frequency is equal to the algebraic sum (i.e., the arithmetic sum or difference) of one or more of the quantum-mechanically determined fundamental frequencies associated with the vibrational modes of the ion-ion crystal bond.

Treating the interatomic bond in accordance with quantum-mechanical principles, the vibrational energy for a particular normal vibration $v$ can be represented by the general equation:

$$E = (v+a)hc\nu$$

where $v$ is the vibrational quantum number (0, 1, 2 . . .), $a$ is equal to $\frac{1}{2}$ for a linear oscillator and to unity for a two-dimensional oscillator, $h$ is the Planck constant and $c$ is the velocity of light. From this, through application of resonance and perturbation theory with the aid of the Schrödinger relationship (see Pauling and Wilson, Introduction to Quantum Mechanics), it can be shown that:

$$\frac{\partial^2 u}{\partial t^2} + \omega^2(1 + 2\Gamma \cos 2\omega t)u = 0$$

The frequency $\omega$ is, of course, characteristic of the particular type of atom, the electronic orbital concerned and any perturbing effects such as the presence of adjacent fields etc. The algebraic sum (e.g., $f_1 + f_2 \ldots f_n$ or $f_1 - f_2 \ldots f_n$) of one or more characteristic frequencies $f_1, f_2 \ldots f_n$ can serve to determine the frequency of the energizing field. The frequencies themselves can be determined from SPECTRA (vibrational RAMAN) or concluded from the quantum term. Similar relationships govern the selection of frequencies for vibrational excitation of the atoms. It is thus possible in, say, a solid mixture or alloy to rupture selected ion-ion bonds and to selectively render one or more ions mobile by the use of this relationship of the sum and differences of the resonant frequencies.

When the present technique is employed to reorient a strained molecular structure, an impulsive disruptive force is applied to the lattice concurrently with a unidirectional electromagnetic force field. The disruptive force can serve to rupture individual and particularly strained bonds while the applied force field maintains the high-energy state of the lattice until molecular reorientation has taken place. The present technique is, in some respects, similar to certain characteristics of the Wien effect which relates to the increase in the conductance of an electrolyte when unidirectional fields with a high-potential gradient are considered. Similarly, the increase in conduction as a consequence of change of frequency must also be noted.

The diffused submicroscopic particles are advantageously derived from the following molecules: oxides, chlorides, bromides, fluorides, iodides and sulfides of copper, silver, cadmium, zinc, lead, iron; the oxides, chlorides, bromides, fluorides and iodides of antimony, aluminum, cobalt, titanium, platinum, sodium and calcium; the oxides, chlorides, bromides and fluorides of magnesium, tin, chromium, magnesium carbonates; the oxides, chlorides, bromides and iodides of gold; the oxides, chlorides, iodides of bismuth and tungsten; the oxides, bromides of manganese the oxides and iodides of nickel and cesium; the nitrides of boron and iron; silicon hexafluoride; molybdenum disulfide, and tungsten carbide.

The above and other objects, features and advantages of the present invention will become more readily apparent from the following description, reference being made to the specific examples and the accompanying drawing in which:

FIGS. 1–6 are diagrammatic views of circuit arrangements for carrying out the present methods.

In FIG. 1 there is shown an apparatus for reorienting a lattice structure and, more specifically, for converting a dendritic mass 10 of sintered metal particles into a more ordered state. The mass 10, which can be composed of a sintered nickel, compacted alnico, electroformed zinc or a similar body is sandwiched between a pair of electrodes 11 and 12 across which is connected a source 13 of unidirectional (direct) electric current. Resistor 14 is representative of the line impedance and provides, in conjunction with capacitor 15 connected across the electrodes, a time-constant network capable of inducing spark discharge in the region of the dendritic mass 10. The electrodes bear lightly against the mass (with a pressure on the order of one atmosphere).

*Example I*

A mass of dendritic nickel powder is sintered under the usual conditions of heat and pressure to produce a nickel electrode for an alkaline storage cell. The dendritic body 10 (which can have a thickness of approximately 8 mm.) is found, upon microscopic examination, to have a random orientation and distribution of dendritic particles. The life of such a plate can be materially increased if the dendrites are ordered by placing the plate between inert electrodes 11 and 12 (i.e., composed of stainless steel) while the source 13 develops a unidirectional electric field, having a potential gradient between $10^4$ and $10^6$ volts/cm. thereacross. The capacitor 15 periodically discharges across the electrodes to produce a spark which apparently disrupts the metal-metal bonds within the sintered body to permit their reorientation in line with the voltage gradient. It is believed that there is thus produced some form of ionization upon spark discharge which permits the unidirectional field to be highly effective.

Figure 2:
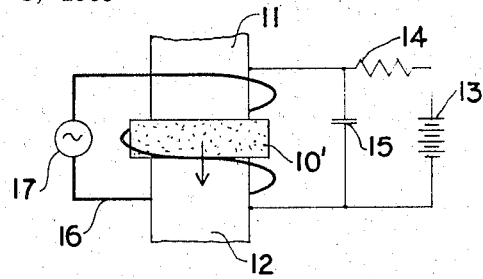
Figure 3:
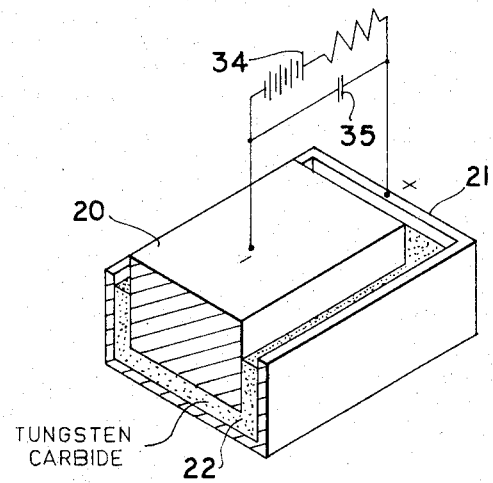
Figure 4:
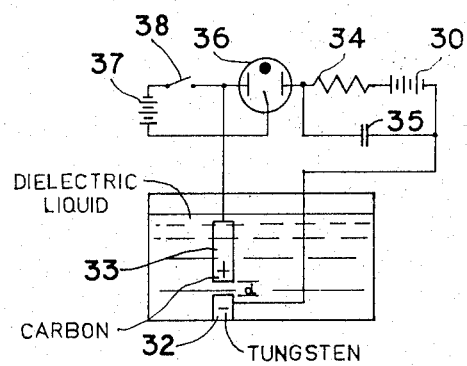

In FIG. 2 there is shown an arrangement whereby the unidirectional source 13 and capacitor 15 are supplemented by a magnetizing coil capable of devolving a flux on the order of $10^8$ to $10^{10}$ gauss per second. When the energizing source for this coil 16 is in step with the decay of the spark discharge, the magnetic flux has been found to delay the stabilization of the crystal structure within body 10′ so as to permit the unidirectional field of source 14 to be effective for much longer periods. The treatment time can, by this method, be reduced to a fraction of that which would be necessary in the absence of the magnetic field. It has been discovered, furthermore, that the unidirectional source 13 can be dispensed with when the magnetizing means are employed since the flux is apparently capable of inducing a unidirectional potential gradient sufficient to reorient the crystal. In order to activate and disrupt the pre-existing molecular bonds, however, it may be desirable to apply heat (sufficient to raise the temperature of the body to redness) or pressure.

The apparatus shown in FIG. 2 is also capable of carrying out a diffusion of, say, the material of body 10′ into the electrode 12, which is negative with respect to the body. Surprisingly, it has been found that binary and ternary molecules can be diffused in this manner into a steel electrode when potential gradients upwards of $10^3$ volts/cm. are employed. These materials apparently form cations as a consequence of the spark discharge. Among suitable materials in this connection are tungsten carbide, molybdenum disulfide (which is capable of producing bearing steels having low friction coefficients upon diffusion into a steel body), sulfur nitride, chromium, boron nitride, iron nitride, silicon, cobalt, nickel, silicon fluoride, lead antimonide, lead bismuthide, silver plumbide, copper stannide and bismuth and cadmium binary compounds of tin and lead.

*Example II.—Diffusion of tungsten carbide into steel*

It has been found that it is possible by the method of the present invention to controlledly diffuse tungsten carbide into steel, thereby producing at least surface zones in which tungsten carbide is interstitially held in the ion lattice. Using a device of the type shown in FIG. 3, for example, the steel block 20 is cathodic with respect to the conductive receptacle 21 for the tungsten carbide powder 22 which surrounds the steel. A unidirectional source 23 capable of developing a potential gradient of at least $10^3$ volts/cm. in the region of contact between the powder and the block is connected across the latter and the receptacle 21 together with a capacitor 25 capable of including a spark discharge. An initial temperature of 40° C. is observed at the start of the discharge and, after a treatment time of 15 minutes, this temperature rises to about 150° C. The unidirectional voltage gradient of $10^3$ volts/cm. is employed with a mean current density of $10^2$ amps/cm.$^2$. After the indicated treatment time a diffusion zone of 40 to 50 microns in depth can be observed all along the surface of the steel body in contact with the powder. The steel body is found to have a surface hardness approaching that of tungsten carbide itself and is, in effect, a highly satisfactory tool steel which does not require any further heat treatment or hardening. The body is many times more corrosion resistant than untreated steel, has a resistance to bending stress more than double that of the body prior to diffusion of the tungsten carbide into the ion lattice, and does not show any substantial flaking or brittleness along the surface. Tests carried out without the unidirectional field and at elevated temperatures sufficient to cause some diffusion of tungsten carbide into the body showed that the temperatures required were sufficient to cause considerable softening of the steel with diffusion of carbon out of the latter and only limited formation of any diffusion zone. The principal interaction between the steel and the tungsten carbide was one of adhesion rather than diffusion. A 0.55% carbon steel was used for these tests. At identical operating conditions with, however, substitution of molybdenum disulfide for tungsten carbide as the diffuser, a bearing steel having frictional characteristics closer to that of molybdenum disulfide than to that of steel was obtained. The molybdenum disulfide was not readily eroded from the steel body which it had penetrated to a depth on the order of 50 microns.

*Example III.—Production of tungsten carbide*

It has been discovered that tungsten carbide can be produced by the present method without resort to the high temperatures previously required to fuse carbon to tungsten. With the aid of a device such as that shown in FIG. 4, tungsten from the cathode 32 was diffused into the carbon anode 33 with the aid of spark ionization and a unidirectional field having a potential gradient of $10^6$ volts/cm. The electrodes were immersed in a dielectric liquid (transformer oil) having a high breakdown voltage and separated by a gap $d$ of 2 to 5 microns. The unidirectional source 30, connected in series with an impedance 34 and bridged by the discharge capacitor 35, was tied across the electrodes 32, 33 via a controlled breakdown device 36 of the gas-filled or spark-gap type. The control electrode of this device could be energized from a battery 37 via a switch 38 to initiate discharge. An electric spark pulse of a duration of 400 microseconds was developed across the electrodes at an ambient temperature of about 40° C. The current density was approximately $10^5$ amp/cm.$^2$. It was found that the spark produces the required ionization of tungsten while the decay of the spark pulse provides a unidirectional potential on the order of $10^6$ volts/cm. which causes the tungsten to penetrate the carbon. The carbon surface was then tested with a Vickers hardness tester and found to have a value of over 2000 $H_v$; the meter of the instrument stops indicating at this point. The calculated hardness of the surface was equivalent to about 6000 $H_v$. These values compare with the hardness of 1400 $H_v$ obtained with ordinary tungsten carbide. Surprisingly, the tungsten carbide produced by this method has a lattice structure closely approximating that of diamond with a lattice constant $a$ of 2.98 A., lattice constant $c$ of 4.74 A. and a $c/a$ ratio of 1.59. These values contrast with conventional tungsten carbide which has a lattice constant $a$ of 2.90–2.91 A., a lattice constant $c$ of only about 2.83 A. and a $c/a$ ratio of 0.975.

While tungsten-carbide bodies can be produced directly by this method, it should also be noted that tungsten-carbide-tipped tools and the like can be produced, for example, by diffusing carbon into steel (e.g., as described with reference to FIG. 3) and subsequently diffusing tungsten into the resulting surface zone.

*Example IV*

Figure 5:
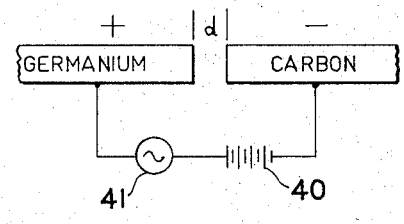

Diamond was produced by replacing germanium atoms or ions in the usual diamond-type germanium lattice with carbon. As indicated in FIG. 5, a block of carbon was disposed as the cathode in close proximity ($d=2-5$ microns) to the germanium anode while a unidirectional field from battery 40 produced a voltage gradient of about $10^2$ volts/cm. An activation frequency of 88 kc./sec. was superimposed upon the unidirectional field by a high-frequency generator 41. The high-frequency activation energy is apparently capable of disrupting the germanium bonds sufficiently to render germanium ions mobile and free sites in the germanium lattice for subsequent occupation by carbon ions. The latter are produced by the spark discharge developed between the two electrodes at the high frequency of the alternating current source and diffuse under the action of the unidirectional field into a germanium lattice substantially unimpeded. After a treatment time of about 500 microseconds, five diamond particles are produced with an average particle size of seven microns. The entire operation is conducted under an ambient dielectric liquid such as kerosene or transformer oil.

The germanium base material has a lattice constant $a$ of 5.63 A., a density $\rho$ of 5.35 and a melting point of about 960° C. The interatomic distance is approximately 2.44 A. units. Since the ionic radius of carbon is close to or less than this interatomic spacing, the carbon diffuses into the germanium lattice with a mobility similar to ionic mobility in solutions. The diamond particles were found to have a density approximating that to be expected of diamond (3.50), whereas the starting body of amorphous carbon had a density of only 2.25. Analysis of the particles indicated that they indeed had the lattice constants to be expected of diamonds and an interatomic spacing of 1.54 A.

Similar techniques were employed to produce silicon carbide by diffusion of carbon into a silicon lattice, aluminum antimonide by diffusion of aluminum into an antimony lattice and zinc selenide by diffusion of zinc into a selenium lattice.

*Example V*

Figure 6:
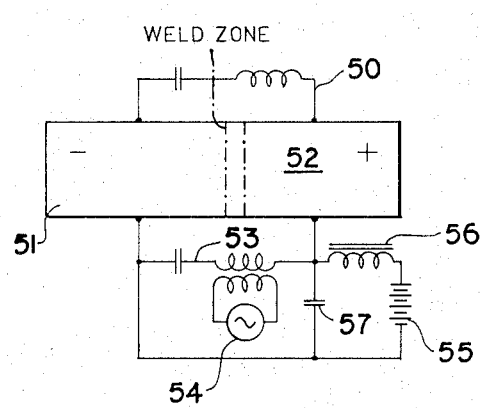

The present techniques can also be employed to weld bodies of the same or similar material together. The device of FIG. 6 shows a resonant network 50 connected across the cathodic body 51 of carbon steel (0.55% carbon) and an anodic body 52 of alloy steel. The latter consists substantially of 18 weight percent tungsten, 4% chromium, 1% vanadium and 0.5% molybdenum, the balance being iron and carbon (about 0.6% carbon). The electrodes are also bridged by the tuned network 53 coupled with a source 54 of high-frequency alternating current and are bridged by a unidirectional source 55, its pulse-shaping inductance 56 and a spark-discharging capacitor 57. The unidirectional potential applied across the bodies is about 200 volts while a 100-volt, 5 kc./sec. alternating field is applied to resonant network 53 in order to activate the atoms of one of the lattices. The resonant network 50 applies a 12-kc./sec. current across the gap. After a period of 5 seconds an interdiffusion is effected to form a welded zone of 0.05 mm. which is indistinguishable and possesses greater strength, shear resistance and bending resistance than either of the two bodies. Instead of two activation frequencies, a single activation frequency, which is the sum or difference of the required molecular vibrational frequencies, can be employed. Each of the two applied frequencies may serve to activate only ions of one of the bodies if desired. The spark discharge developed via capacitor 57 also facilitates the ionization and interdiffusion.

*Example VI*

A ferrochrome (70% chromium, 30% iron) or high-carbon steel can be hardened by nitrogen diffusion into the steel. In this case an electrode is juxtaposed with the steel body in a nitrogen atmosphere and a discharge at a nitrogen-activation frequency of about 480 kc./sec. is carried out with an energy of 80 joules/cm.² A high degree of nitrification of the surface was found and a hardness of 1300 $H_v$ indicated. A nitrogen-resonance frequency of 100–200 kc./sec. was used with similar results.

*Example VII*

The controlled diffusion technique was also employed in the hardening of concrete. A cement consisting essentially of 20% silicon dioxide, 60% calcium-oxide, 10% aluminum dioxide and 10% iron-oxide, magnesium oxide and sodium salts in approximately equal proportions was sintered and crushed in the usual manner to have a specific gravity of about 3.8. This cement was admixed with 3 weight-percent calcium fluoride and then combined with three parts sand by volume to the one part cement. A body of this concrete was mixed for ten minutes during electrolysis between steel electrodes spaced by about 20 cm. and having diameters of 5 cm. with a direct current of 8–9 volts and a current of 100 milliamps. Setting for a period of 72 hours after ten minutes treatment with the electrolysis current yielded a concrete whose compressive strength was 70.0 kg./cm.² as opposed to 52.0 kg./cm.² for a body of identical shape and composed of identical materials untreated by electrolysis.

*Example VIII*

A dry cell was prepared by dispensing a layer of sodium or calcium fluoride between 1.5 mm. and 2 mm. in thickness along the interior of a zinc can forming the negative terminal of the battery. The can was then filled with the usual paste of ammonium chloride and manganese dioxide. A carbon electrode served as an anode. After a shelf time of six months, this battery and a cell not provided with the fluoride layer adjacent the zinc electrode were tested by discharge through a 5-ohm load until the potential fell to 0.85 volt. The conventional battery discharged only for 420 minutes until cut off, while the fluoride-containing battery discharged for 660 minutes, almost 25% greater. It is believed that the improved results derive from parasitic currents along the can which cause the conversion of zinc oxide to zinc fluoride and maintain the zinc in a convenient state for subsequent discharge whereas earlier cells cause the formation of zinc oxide which when becomes unavailable for subsequent reaction. In the present cell the zinc oxide can react with the fluoride and be converted into a convenient state for further reaction.

What is claimed is:

1. A method of controlledly diffusing submicroscopic particles within a solid crystal-lattice structure, comprising the steps of imparting impulsive spark-discharge energy to said particles of an intensity and character sufficient to render at least some of said particles ionically charged and relatively mobile; applying a unidirectional electromagnetic force field to said particles, while they are ionically charged and relatively mobile, equivalent to an electric field of a potential gradient of at least $10^3$ volts/cm. or a magnetic field with a flux $dH/dt$ on the order of $10^8$ to $10^{10}$ gauss/sec. and sufficient to effect a substantially unidirectional drift of said particles in the direction of said field; and thereafter terminating said force field to recover said lattice structure with said particles contained therein.

2. The method defined in claim 1 wherein said particles are constituted of a material other than that constituting said lattice structure and are derived from a body juxtaposed with said lattice structure and are diffused into said structure with at least partial reverse diffusion of particles from said lattice structure into said body, said particles being formed by effecting a spark discharge between said body and said structure.

3. The method defined in claim 1 wherein said particles are constituted of a material other than that constituting said lattice structure and are produced externally of said lattice structure and diffused into the latter, further comprising the step of activating atoms of said structure by high-frequency energy so as to render them relatively mobile and adapted to be influenced by said force field, thereby diffusing them out of said lattice structure while replacing them with said particles, said atoms being activated by electromagnetic energy at substantially a frequency harmonically related to a vibrational mode of the atoms of said lattice structure and said atoms are diffused from said lattice structure under the influence of said force field.

4. The method defined in claim 3 wherein the frequency of the electromagnetic energy is substantially equal to the algebraic sum of at least two resonant frequencies characteristic of said atoms.

5. A method of improving the wear resistance of an ion body comprising the steps of effecting a spark discharge in the region of said body and in the presence of tungsten carbide to produce ionically charged particles of the latter, and applying an electromagnetic field to said body of such polarity as to diffuse said ionically charged particles into said body, thereby producing a relatively hard surface zone.

6. A method of controlledly diffusing into and within a solid crystal-lattice structure submicroscopic particles of a material other than that constituting said lattice structure, comprising the steps of juxtaposing a substance containing the material constituting said particles with said lattice structure; forming said particles from said substance by activating same at a high frequency at least in the region of juxtaposition of said substance and said lattice structure; and applying a unidirectional force field by the application of a magnetic flux across said lattice structure of an intensity and direction sufficient to effect a drift of said particles into and within said lattice structure.

7. The method defined in claim 6 wherein the high-frequency activation of said substance in said region is produced by effecting a spark discharge in said region, said magnetic flux being on the order of $dH/dt = 10^8$ to $10^{10}$ gauss/sec.

8. A method of controlledly diffusing within a solid crystal-lattice structure submicroscopic particles of a material identical with that constituting said lattice structure, comprising the steps of subjecting said lattice structure to a stress sufficient to disrupt at least part of the lattice bonds of said lattice structure without melting same while forming said particles therefrom; applying a unidirectional electromagnetic force field to said lattice structure in a direction and of an intensity sufficient to effect a drift of said particles in the direction of said field; and thereafter terminating said force field and said drift of said particles to obtain said lattice structure in a reoriented state, said stress being derived from the application of an electromagnetic field to said lattice structure substantially in phase with and of a frequency harmonically related to the vibrational resonant frequency of the atoms constituting said lattice structure.

References Cited

UNITED STATES PATENTS

| | | | |
|---|---|---|---|
| 1,872,065 | 8/1932 | Duffendack et al. | 204—164 |
| 2,711,379 | 6/1955 | Rothstein | 148—1.5 |
| 2,916,409 | 12/1959 | Bucek | 148—16.6 |
| 3,082,162 | 3/1963 | Kulp et al. | 204—157.1 |
| 3,099,589 | 7/1963 | Tanaka | 148—16.5 |

HOWARD S. WILLIAMS, *Primary Examiner.*

JOHN H. MACK, *Examiner.*